US007884571B2

(12) United States Patent
Veselic (10) Patent No.: US 7,884,571 B2
(45) Date of Patent: *Feb. 8, 2011

(54) SYSTEMS AND METHODS FOR CHARGING A CHARGEABLE USB DEVICE

(75) Inventor: Dusan Veselic, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/695,909

(22) Filed: Jan. 28, 2010

(65) Prior Publication Data

US 2010/0127864 A1 May 27, 2010

Related U.S. Application Data

(63) Continuation of application No. 11/057,976, filed on Feb. 15, 2005, now Pat. No. 7,679,317.

(51) Int. Cl.
*H02J 7/00* (2006.01)
*H02J 7/04* (2006.01)

(52) U.S. Cl. .................. 320/107; 320/106; 320/114; 320/137; 320/161

(58) Field of Classification Search .................. 320/107
See application file for complete search history.

(56) References Cited

U.S. PATENT DOCUMENTS 6,936,936 B2 * 8/2005 Fischer et al. ............... 307/151

| 7,679,317 | B2 * | 3/2010 | Veselic ............... 320/107 |
| 2003/0052547 | A1 | 3/2003 | Fischer et al. |
| 2003/0054703 | A1 | 3/2003 | Fischer et al. |
| 2003/0070103 | A1 | 4/2003 | Kim |
| 2004/0260850 | A1 * | 12/2004 | Yu et al. ............... 710/104 |
| 2005/0174094 | A1 | 8/2005 | Purdy et al. |
| 2006/0181241 | A1 | 8/2006 | Veselic |

FOREIGN PATENT DOCUMENTS

| EP | 1333360 A2 | 8/2003 |
| EP | 1487081 A2 | 12/2004 |
| WO | 2005013456 A1 | 2/2005 |

* cited by examiner

*Primary Examiner*—Edward Tso
*Assistant Examiner*—Johali A Torres Ruiz
(74) *Attorney, Agent, or Firm*—Conley Rose, P.C.; J. Robert Brown, Jr.

(57) ABSTRACT

Systems and methods are provided for charging a USB device. A USB connector may be used to couple the system to a USB port on the USB device, the USB connector including a bus voltage (Vbus) connector, a positive data (D+) connector, and a negative data (D−) connector. Charger circuitry may be used to receive a source voltage and convert the source voltage into the bus voltage (Vbus), wherein the bus voltage (Vbus) is used to charge the USB device. Presence detect circuitry may be used to compare a first voltage present on the D+ connector with a second voltage present on the D− connector in order to detect when the USB connector is coupled to the USB port of the USB device.

10 Claims, 7 Drawing Sheets

SYSTEMS AND METHODS FOR CHARGING A CHARGEABLE USB DEVICE

CROSS-REFERENCE TO RELATED APPLICATIONS

This continuation application claims priority from U.S. patent application Ser. No. 11/057,976, filed Feb. 15, 2005 by Dusan Veselic entitled "Systems and Methods for Charging a Chargeable USB Device" (21327-US-PAT-4214-02000) which is incorporated by reference herein as if reproduced in its entirety.

BACKGROUND

The technology described in this patent document relates generally to the field of power adapters. More particularly, this patent document describes systems and methods for charging a chargeable Universal Serial Bus (USB) device that is particular well-suited for supplying power to a mobile device, such as a wireless two-way messaging device, a cellular telephone, a personal digital assistant (PDA), or other hand-held device having a rechargeable power source.

Providing an external source of power to a mobile device, such as a personal digital assistant ("PDA"), wireless two-way messaging device, cellular phone, and others, requires design considerations with respect to both the mobile device and the power source. Most mobile devices provide a distinct power interface for receiving power from a power source, for instance to recharge a battery, and a separate data interface for communicating. For example, many mobile devices use USB (Universal Serial Bus) interfaces for communicating and use a separate power interface, such as a barrel connector, for receiving power.

SUMMARY

In accordance with the teachings described herein, systems and methods are provided for charging a USB device. A USB connector may be used to couple the system to a USB port on the USB device, the USB connector including a bus voltage (Vbus) connector, a positive data (D+) connector, and a negative data (D−) connector. A charger circuit may be used to receive a source voltage and convert the source voltage into the bus voltage (Vbus), wherein the bus voltage (Vbus) is used to charge the USB device. A presence detect circuit may be used to compare a first voltage present on the D+ connector with a second voltage present on the D− connector in order to detect when the USB connector is coupled to the USB port of the USB device.

DETAILED DESCRIPTION

Figure 1:
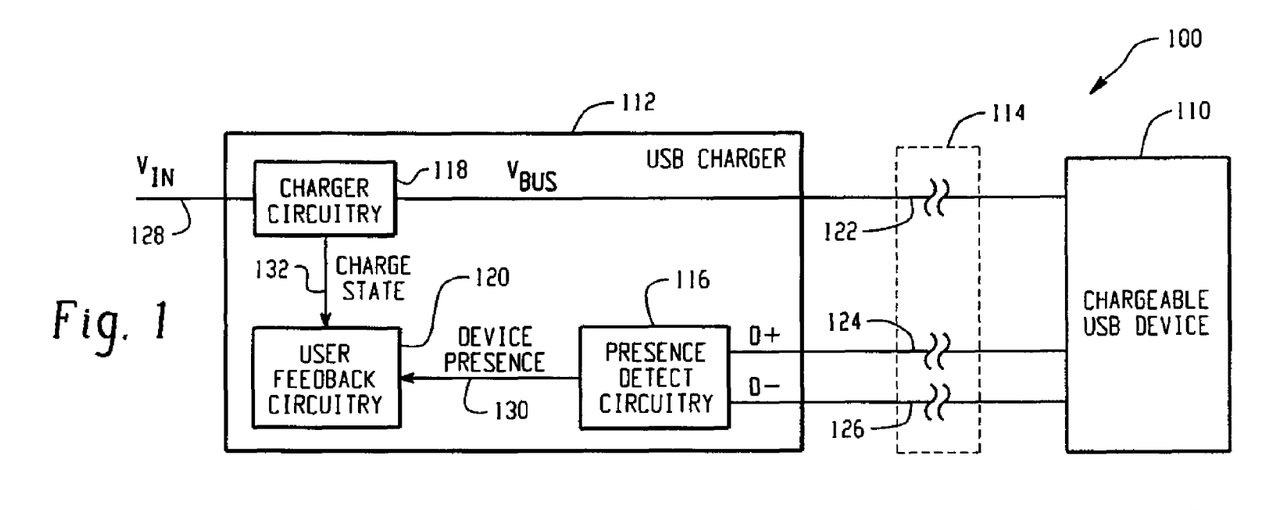
FIG. 1 is a block diagram of an example system for charging a chargeable USB device.

FIG. 1 is a block diagram of an example system 100 for charging a chargeable USB device 110. The chargeable USB device 110 may be a mobile device (e.g., personal digital assistant (PDA), cellular telephone, two-way pager, etc.) that includes a USB port and a rechargeable power source, such as a Lithium-Ion battery or some other type of rechargeable battery. The system 100 includes a USB charger 112 that is coupled to the chargeable USB device 110 by a USB connector 114. The USB charger 112 includes presence detect circuitry 116, charger circuitry 118, and user feedback circuitry 120.

The USB connector 114 may be a standard 4 pin USB-type connector having a voltage bus (Vbus) connector 122, a positive data (D+) connector 124, a negative data (D−) connector 126, and a ground connector (not shown), as described, for example, in the Universal Serial Bus Specification, Revision 2.0, published Apr. 27, 2000. The USB connector 114 may, for example, be included within the same physical housing as the USB charger 112. A USB port on the chargeable USB device may be connected to the USB connector 114 using a docking cradle, a USB cable, or by other suitable means.

The charger circuitry 118 in the USB charger 112 is operable to receive a source voltage 128 from an external power source and to convert the source voltage into the bus voltage (Vbus) 122. The charger circuitry 118 may be configured to operate with either an AC external power source, such as a conventional household power outlet, or a DC external power source, such as the power socket in an automobile, or a battery. In the case of an AC power source, the charger circuitry 118 may include an AC/DC converter than converts the AC source voltage into a regulated DC voltage (Vbus) 122. If the external power source is a DC power source, then the charger circuitry 118 may include a DC/DC converter to generate the regulated DC voltage (Vbus) 122.

The presence detect circuitry 116 in the USB charger 112 is operable to detect when the chargeable USB device 110 is connected to the D+ and D− lines 124, 126 of the USB connector 114. In accordance with the USB Specification, a logic high state on both the D+ and D− lines 124, 126 signals an "Illegal" state, and a logic low state on both the D+ and D− lines signals a "Reset" state. The USB charger 112 may thus take advantage of the "Illegal" or "Reset" states to signal its presence to the chargeable USB device 110 and to detect the presence of the chargeable USB device 110 attached to the USB connector 114. In this manner, the chargeable USB device 110 may be configured to use the D+ and D− lines 124, 126 to communicate presence information with the USB charger 112, without interfering with the device's 110 ability to communicate with a typical USB host device. For example, when the chargeable USB device 110 detects power on the Vbus lines 122, it may first attempt to establish a connection with a USB host using a standard USB enumeration process. If a USB host is not detected, then the USB device 110 may be configured to monitor the D+ and D− lines to detect the presence of an "Illegal" or "Reset" state, indicating the presence of a USB charger 112. The chargeable USB device 110 may, in turn, communicate its presence to the USB charger 112 using the D+ and D− lines.

In one example, the chargeable USB device 110 may communicate its presence to the USB charger 112 by varying the voltage of the D+ or D− line. For example, if both the D+ and D− lines are pulled to a logic high voltage level to provide an "Illegal" USB state, then the chargeable USB device 110 may communicate its presence by varying the voltage of the D+ or D− line within the logic high voltage range (3.0V-3.6V according to USB specifications). The presence detect circuitry may then detect the presence of the chargeable USB device 110 by comparing the D+ and D− voltages to detect a voltage change. For example, the presence detect circuitry may generate an "Illegal" USB state with the voltage of the D− line 126 being slightly higher than the voltage of the D+ line (within the allowable logic high range). Upon detecting the presence of the USB charger 112, the chargeable USB device 110 may then pull up the D+ line 124 above the voltage of the D− line 126. By comparing the D+ and D− voltages, the presence detect circuitry 116 may then detect the voltage change to identify the presence of the USB device 110.

The user feedback circuitry 120 in the USB charger 112 may be operable to communicate charger information to a device user. For example, the user feedback circuitry 120 may receive a device presence signal 130 from the presence detect circuitry 116 that indicates that an attached USB device 110 has been detected. The presence detect circuitry 116 may, for example, generate the device presence signal 130 by comparing the voltages on the D+ and D− lines 124, 126, as described above. In addition, the user feedback circuitry 120 may receive a charge state signal 132 from the charger circuitry 118 that indicates that power is being supplied via the Vbus connector 122. The user feedback circuitry 120 may, for example, communicate the state of the device presence 130 and/or charge state 132 signals with one or more user interface devices, such as a light-emitting diode (LED), a liquid crystal display (LCD), a sound generator (beeper, buzzer, etc.), and/or other suitable device(s).

Figure 2:
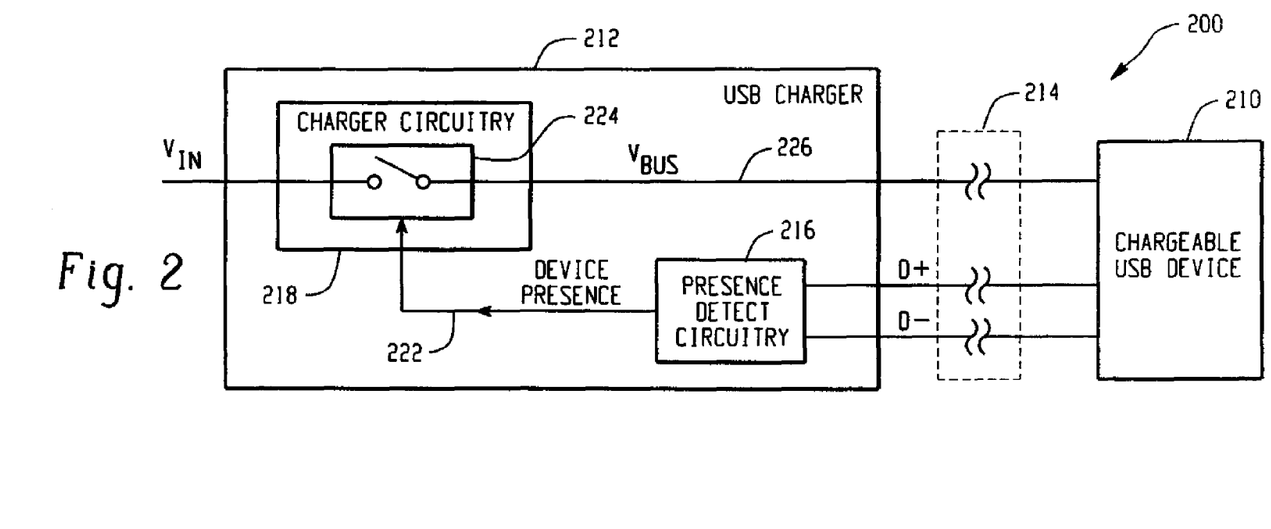
FIG. 2 is a block diagram of another example system for charging a chargeable USB device.

FIG. 2 is a block diagram of another example system 200 for charging a chargeable USB device 210. In this example 200, the USB charger 212 includes presence detect circuitry 216 and charger circuitry 218. The presence detect circuitry 216 in this example 200 operates to detect the presence of a connected USB device 210 and to generate a device presence signal 222, similar to the presence detect circuitry 116 described above with reference to FIG. 1. In this example 200, however, the device presence signal 222 is used to control an operation 224 of the charger circuitry 218. For example, upon detecting the presence of a connected USB device 210 the presence detect circuitry 216 may generate the device presence signal 222 to instruct the charger circuitry 218 to supply a regulated voltage on the Vbus line 226. In another example, the charger circuitry 218 may limit the regulated voltage and/or current available on the Vbus line 226 until the device presence signal 222 indicates the presence of an attached USB device 210. In this manner, a first regulated voltage and/or current may be generated by the charger circuitry 218 for use by the chargeable USB device 210 in detecting the USB charger 212, and a second regulated voltage and/or current may be generated by the charger circuitry 218 for use in charging the USB device 210.

Figure 3:
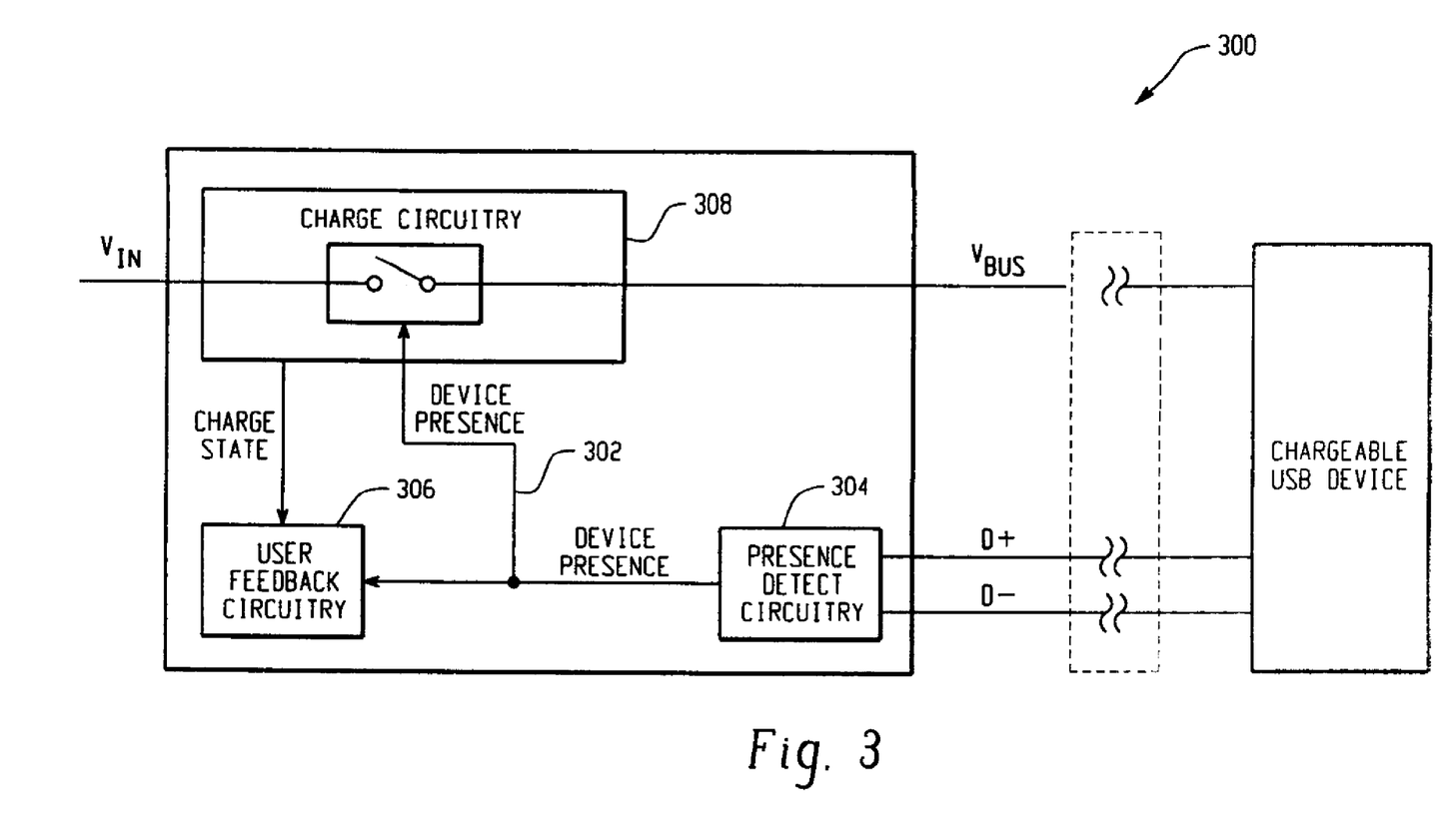
FIG. 3 is a block diagram of a third example system for charging a chargeable USB device.

FIG. 3 is a block diagram of a third example system 300 for charging a chargeable USB device. In this example 300, the device presence signal 302 generated by the presence detect circuitry 304 is used both to communicate presence information to a user via the user feedback circuitry 306 (similar to FIG. 1), and to control the charge circuitry 308 (similar to FIG. 2).

Figure 4:
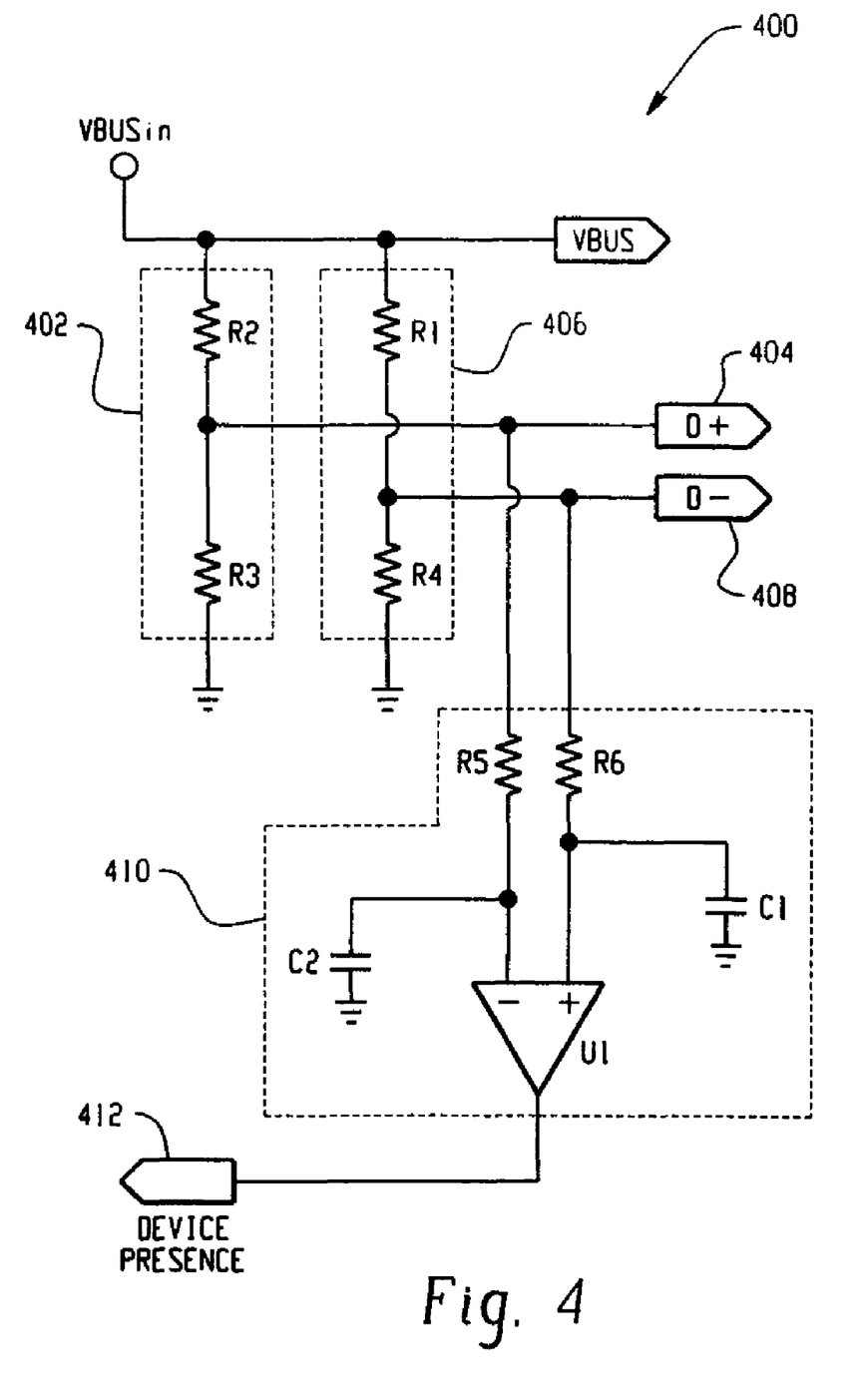
FIG. 4 is an electrical diagram of an example presence detect circuit for a USB charger.

FIG. 4 is an electrical diagram of an example presence detect circuit 400 for a USB charger. The presence detect circuitry 400 includes a first voltage divider circuit 402 for applying a first voltage to the D+ connector 404, and a second voltage divider circuit 406 for applying a second voltage to the D− connector 408. The presence detect circuit 400 further includes a comparison circuit 410 that is configured to compare the voltages on the D+ and D− lines 404, 408 to generate a device presence signal 412. The example presence detect circuitry 400 may, for example, be used as the presence detect circuitry 116, 216, 304 in the example systems of FIGS. 1-3.

The first and second voltage divider circuits 402, 406 may each include a pull-up resistor (R2 and R1) for respectively coupling the D+/D− line 404, 408 to a reference voltage (VBUSin) and a pull-down resistor (R3 and R4) for respectively coupling the D+/D− line 404, 408 to a ground potential. The resistor values in the voltage divider circuits 402, 406 may be selected to generate a USB "Illegal" state (both logic high) or a USB "Reset" state (both logic low) on the D+/D− lines 404, 408. In addition, the resistor values (R1-R4) may be selected such that the voltage present on one of the D+ and D− lines 404, 408 is higher that the other, while maintaining the desired logic state. For example, if a USB "Illegal" state is used to communicate presence information to a chargeable USB device, as described above, then the voltage on one data line (e.g., the D− line 408) may be set higher than the voltage on the other data line (e.g., the D+ line) 404, within the allowable logic high range (e.g., according to the USB Specification).

The comparison circuit 400 may include a comparator (U1), a first resistor-capacitor (RC) circuit (R6 and C1) and a second RC circuit (R5 and C2). The first RC circuit (R6 and C1) couples the D− line 408 to a first input of the comparator (U1), and the second RC circuit (R5 and C2) couples the D+ lines 404 to a second input of the comparator (U1). The comparator (U1) is configured to compare the voltages present at its inputs (+ and −) to generate the device presence signal 412. In operation, before a USB device is attached, the difference between the voltage levels on the D+ and D− lines 404, 408 cause the comparator (U1) to generate the device presence signal 412 at a first logic level. The voltage levels present on the D+ and D− lines 404, 408 may then be varied by an attached USB device to indicate its presence. Once the voltages of the D+ and D− lines are varied by an attached USB device, the new voltage levels cause the comparator (U1) to generate the device presence signal 412 at a second logic level. For example, the D− line may be pulled to a higher voltage level than the D+ line before a USB device is attached, causing the comparator (U1) to generate a logic high output 412 (indicating the non-presence of a USB device). Once connected, the USB device may then cause the D+ line 404 to be pulled to a higher voltage than the D− line 408, causing the comparator (U1) to transition to a logic low output 412 (indicating the presence of a USB device).

Figure 5:
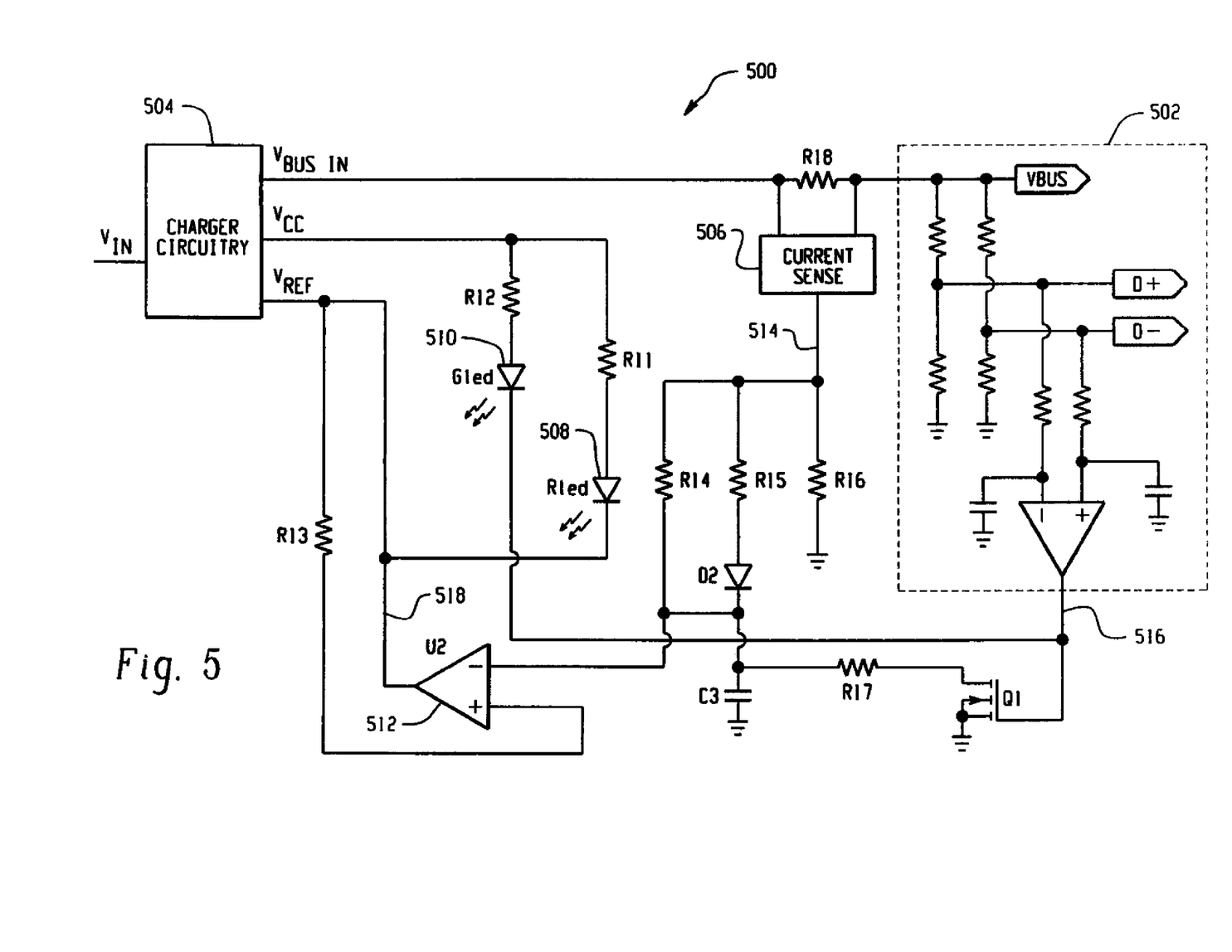
FIG. 5 is an electrical diagram of an example USB charger.

FIG. 5 is an electrical diagram of an example USB charger 500. The charger 500 includes presence detect circuitry 502 and charger circuitry 504, as described above. Also included in FIG. 5 is an example of user feedback circuitry for communicating presence information and charge state information to a device user. The user feedback circuitry includes a current sense circuit 506, a red LED 508, a green LED 510, and a comparison circuit (U2) 512. In operation, the green LED 510 is used to indicate that a USB device is connected to the charger, and the red LED 510 is used to indicate that the connected USB device is drawing power (e.g., charging) from the Vbus line.

The green LED 510 is controlled by the output 516 of the presence detect circuitry 502. Specifically, the green LED 510 is coupled between a Vcc output (e.g., 5V) from the charger circuitry 504 and the presence detect output 516. When the presence detect output 516 transitions to a logic low state as a result of an attached USB device (as described above with reference to FIG. 4), current flows through the green LED 510, causing it to turn on. When the USB device is detached, the presence detect output 516 transitions to a logic high state, turning off the green LED 510.

The red LED 508 is controlled by the comparison circuit 512 (U2), which compares the output 514 of the current sense circuit 506 with a reference voltage (Vref) to generate a charge state output 518. The comparison circuit 512 may be a comparator, or some other type of circuit for comparing two input voltages. The current sense circuit 506 may be a current mirror that generates an output 514 that is proportional to the Vbus current. In operation, when an attached USB device draws power from the charger circuitry 504, the current drawn from the Vbus line is mirrored as the current sense output 514. The current sense output 514 is stabilized (R14 and C3) and input to the comparison circuit 512. When current is drawn from the Vbus line, the current sense output 514 causes the charge state output 518 from the comparison circuit 512 to transition to a logic low state, turning on the red LED 508. When the USB device is detached or is otherwise not drawing power from the Vbus line, the current sense output 514 falls below the reference voltage (Vref), causing the charge state output 518 to transition to a logic high state, and turning off the red LED 508.

When a USB device is attached to the charger 500 and begins drawing power from the Vbus line, a large oscillation in current may occur at the mirrored current sense output 514. A large value RC circuit (C3 and R14) may thus be utilized to filter the current sense output 514 and provide a stable input to the comparison circuit U2. However, the charge time resulting from the large value of the capacitor C3 may cause a delay from the time that the USB device is connected until the red LED 508 turns on. In order to help reduce this delay, a diode circuit (D2, R15 and R16) may be included to charge the capacitor C3 more quickly. In addition, a transistor circuit (Q1 and R17) may be included to quickly discharge the capacitor C3 when the USB device is disconnected from the charger 500, causing the red LED 508 to quickly turn off.

Figure 6:
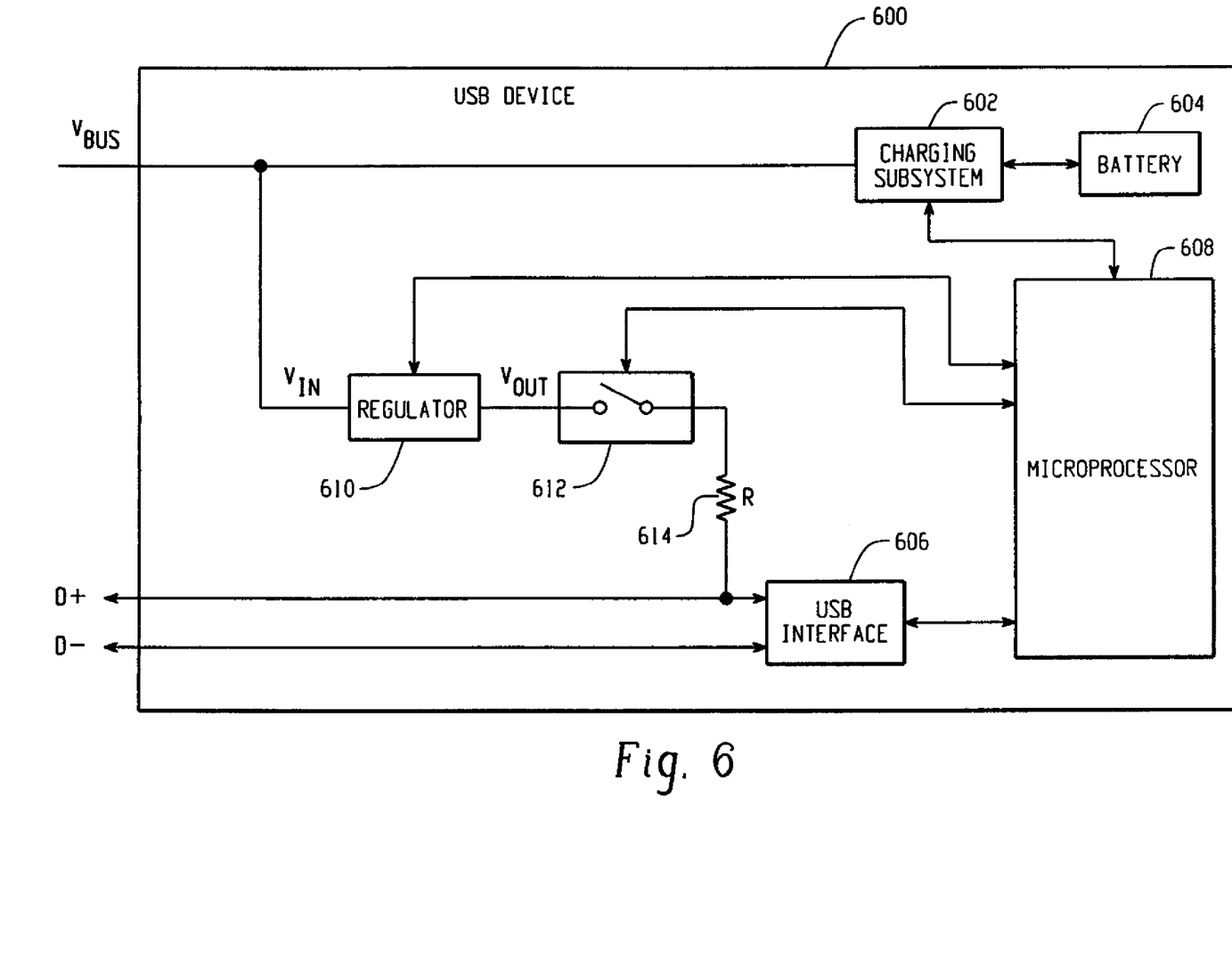
FIG. 6 is a block diagram of an example chargeable USB device.

FIG. 6 is a block diagram of an example chargeable USB device 600. The device 600 includes a charging subsystem 602 for charging a rechargeable battery 604, a USB interface 606 for transmitting and receiving data over the USB data lines (D+/D−), and a microprocessor 608 for controlling the overall operation of the device 600. Also included are a voltage regulator 610, a controllable switching device 612 and a pull-up resistor 614.

When the example USB device 600 is connected to a USB charger, as detailed above, the voltage on the Vbus line is input (Vin) to the regulator 610, which signals the microprocessor 608 that a Vbus voltage has been detected. The microprocessor 608 may then attempt to perform a standard USB enumeration via the USB interface 606, and determine that the attached device is a USB charger when the USB enumeration is not successful. In other examples, the microprocessor 608 may receive a signal over the USB data lines (D+/D−) to identify the attached device as a USB charger, as described in the commonly-owned U.S. patent application Ser. No. 10/864,584, titled "Universal Serial Bus Charger For a Mobile Device," which is incorporated herein by reference. In any case, once the microprocessor 608 has identified the attached device as a USB charger, the microprocessor 608 may then signal the charging subsystem 602 to begin charging the battery 604 from the Vbus line. In addition, the microprocessor 608 may signal the controllable switching device 612 to close, coupling a regulated output (Vout) from the regulator 610 to the pull-up resistor 614. The regulated output (Vout) pulls-up the D+ line to a pre-selected voltage (e.g., above the voltage of the D− line) in order to communicate the USB device's presence to the attached USB charger, as detailed above.

Figure 7:
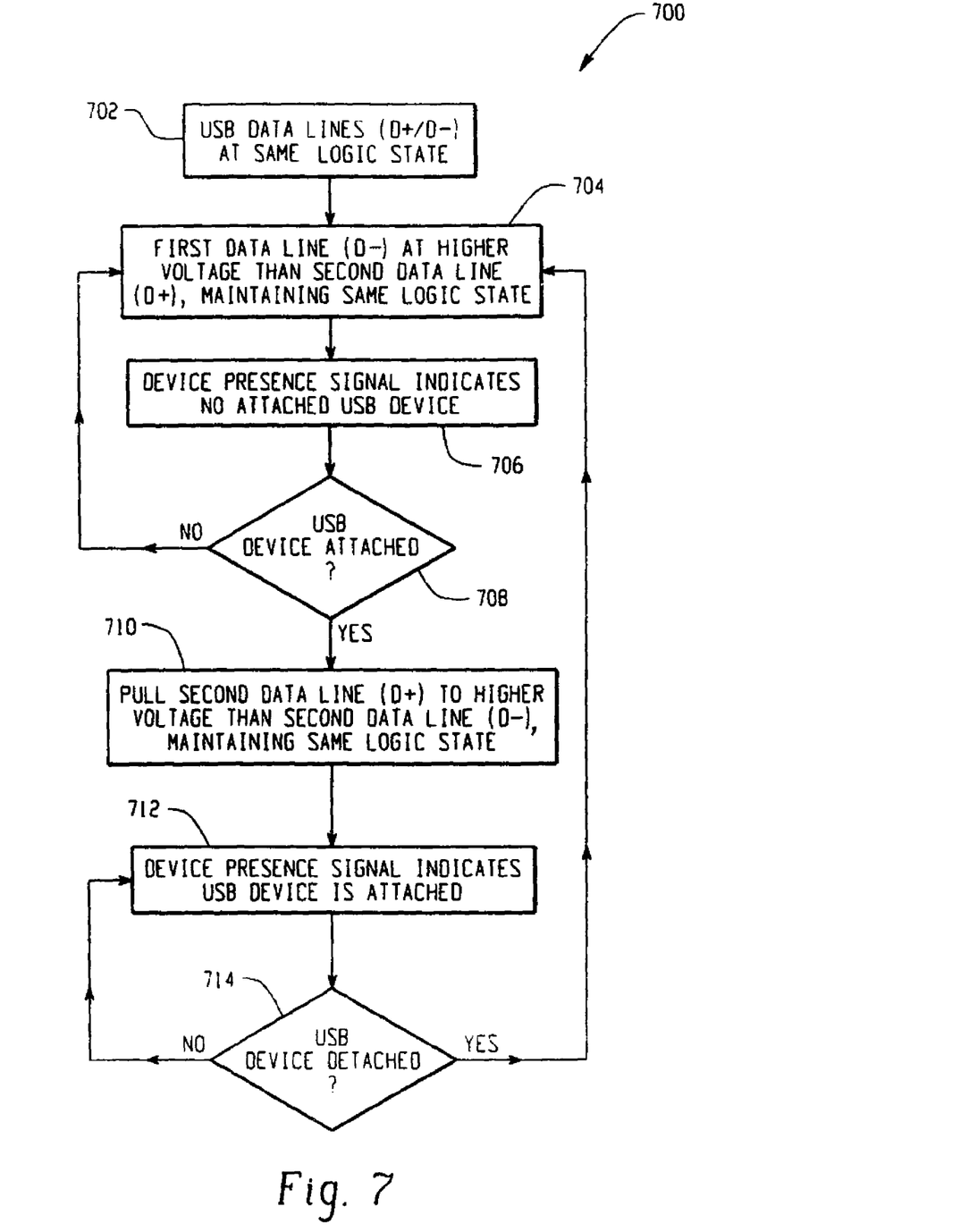
FIG. 7 is a flow diagram of an example method for charging a chargeable USB device.

FIG. 7 is a flow diagram of an example method 700 for charging a chargeable USB device. In step 702, the USB data lines (D+/D−) of a USB charger are at the same logic level, indicating a USB "Illegal" or "Reset" state. At step 704, the higher voltage is applied to a first one of the USB data lines, while maintaining the same logic state as the second one of the USB data lines. For example, if the D+ and D− lines are both in a logic high state, then one of the data lines (D+ or D−) will have a higher voltage within the logic high range than the other one of the data lines (D+ or D−). At step 706, a device presence signal is generated that indicates that no USB device is attached to the USB charger.

At step 708, the method determines if a USB device is attached to the USB charger. If no USB device is attached, then the method repeats from step 704, and the device presence signal continues to indicate that no USB device is attached. However, if a USB device is detected at step 708, then the method proceeds to step 710.

At step 710, the second one of the USB data lines is pulled to a higher voltage than the first one of the USB data lines, while maintaining the same logic state. For example, if the D+ and D− lines where both in a logic high state in step 704 with the D− line having a higher voltage than the D+ line, then in step 710, the voltage on the D+ line is increased (within the logic high range) above the voltage of the D− line. In response to the voltage transition at step 710, the device presence signal transitions at step 712 to indicate that a USB device is attached.

At step 714, the method determines if the USB device continues to be attached to the USB charger. As long as the USB device is attached, the method repeats from step 712, and the device presence signal continues to indicate that a USB device is attached. However, if the USB device is detached from the USB charger, then the method returns to step 704.

Figure 8:
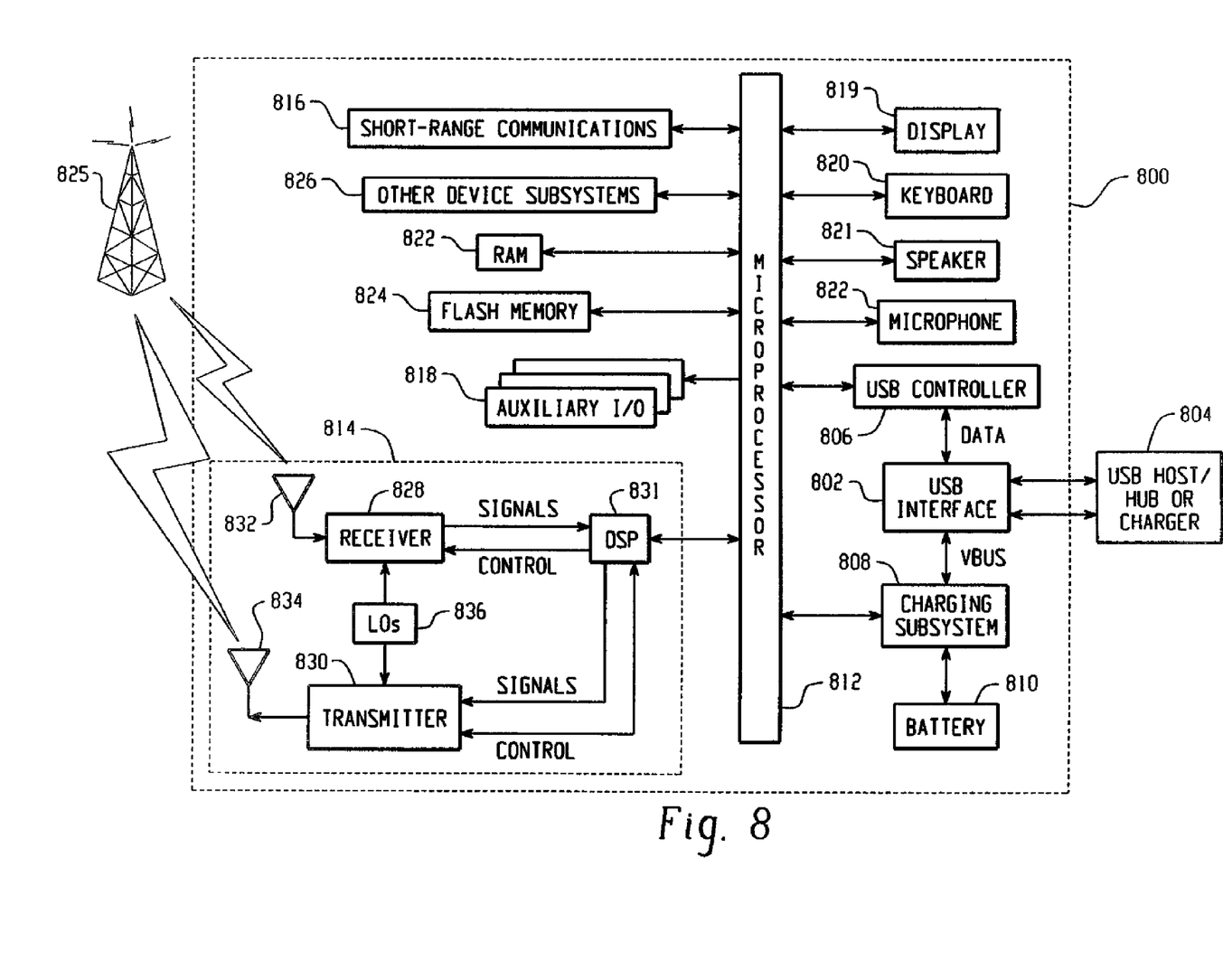
FIG. 8 is a block diagram of an example rechargeable mobile device with a USB interface.

FIG. 8 is a block diagram of an example rechargeable mobile device 800 with a USB interface 802 for coupling the device 800 to a USB host device or a USB charger 804. The mobile device 800 includes the USB interface 802, a USB controller 806, a charging subsystem 808, a rechargeable battery 810, and a processing device 812.

The USB interface 802 and/or USB controller 806 may, for example, include the circuitry described above with reference to FIG. 6 for communicating presence information to a USB charger 804. Operationally, the USB interface 802 is used by the mobile device 800 to provide power to the charging subsystem 808, and may also be used to communicate data between a USB host or hub 804 and the USB controller 806.

The charging subsystem 808 provides power to the mobile device 800, either from the rechargeable battery 810 or from the Vbus line, and charges the rechargeable battery 810 from the Vbus line. The USB controller 806 monitors the USB data lines (D+ and D−), and controls data communication between the processing device 812 and a USB host 804. In addition, the USB controller 806 may be used to detect the presence of a USB charger 804 and communicate presence information to the USB charger 804 (e.g., by varying the voltage of the D+ and/or D− lines), as described above.

In addition to the subsystems and components described above, the mobile device 800 also may include a communications subsystem 814, a short-range communications subsystem 816, input/output devices 818-822, memory devices 822, 824, and various other device subsystems 826.

The processing device 812 controls the overall operation of the mobile device 800. Operating system software executed by the processing device 812 may be stored in a persistent store such as a flash memory 824, but may also be stored in other types of memory devices, such as a read only memory (ROM) or similar storage element. In addition, operating system software, specific device applications, or parts thereof, may be temporarily loaded into a volatile store, such as a random access memory (RAM) 822. Communication signals received by the mobile device 800 may also be stored to RAM 822.

The processing device 812, in addition to its operating system functions, enables execution of software applications on the device 800. A predetermined set of applications that control basic device operations, such as data and voice communications, may be installed on the device 800 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via the wireless network 825. The PIM data items may be integrated, synchronized and updated via the wireless network 825 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is hereby incorporated into the present application by reference.

Communication functions, including data and voice communications, are performed through the communication subsystem 814, and possibly through the short-range communications subsystem 816. If the mobile device 800 is enabled for two-way communications, then the communication subsystem 814 includes a receiver 828, a transmitter 830, and a processing module 831, such as a digital signal processor (DSP). In addition, the communication subsystem 814, configured as a two-way communications device, includes one or more antenna elements 832, 834, and local oscillators (LOS) 836. The specific design and implementation of the communication subsystem 814 is dependent upon the communication network 825 in which the mobile device 800 is intended to operate. For example, a device 800 destined for a North American market may include a communication subsystem 814 designed to operate within the Mobitex™ mobile communication system or DataTAC™ mobile communication system, whereas a device 800 intended for use in Europe may incorporate a General Packet Radio Service (GPRS) communication subsystem.

Network access requirements vary depending upon the type of communication system 825. For example, in the Mobitex™ and DataTAC™ networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 800 may send and receive communication signals over the communication network 825. Signals received by the antenna 832 through the communication network 825 are input to the receiver 832, which may perform such common receiver functions as signal amplification, frequency down conversion, filtering, channel selection, and analog-to-digital conversion. Analog-to-digital conversion of the received signal allows the DSP 831 to perform more complex communication functions, such as demodulation and decoding. In a similar manner, signals to be transmitted are processed by the DSP 831, and are the input to the transmitter 830 for digital-to-analog conversion, frequency up-conversion, filtering, amplification and transmission over the communication network 825 via the antenna 834.

In addition to processing communication signals, the DSP 831 provides for receiver 828 and transmitter 830 control. For example, gains applied to communication signals in the receiver 828 and transmitter 830 may be adaptively controlled through automatic gain control algorithms implemented in the DSP 831.

In a data communication mode, a received signal, such as a text message or web page download, is processed by the communication subsystem 814 and input to the processing device 812. The received signal is then further processed by the processing device 812 for output to a display 819, or alternatively to some other auxiliary I/O device 818. A device user may also compose data items, such as e-mail messages, using a keyboard 821, such as a QWERTY-style keyboard, and/or some other auxiliary I/O device 818, such as a touch-pad, a rocker switch, a thumb-wheel, or some other type of input device. The composed data items may then be transmitted over the communication network 825 via the communication subsystem 814.

In a voice communication mode, overall operation of the device 800 is substantially similar to data communication mode, except that received signals are output to a speaker 821, and signals for transmission are generated by a microphone 822. Alternative voice or audio I/O subsystems, such as a voice message recording subsystem, may also be implemented on the device 800. In addition, the display 819 may also be utilized in voice communication mode, for example to display the identity of a calling party, the duration of a voice call, or other voice call related information.

The short-range communications subsystem 816 enables communication between the mobile device 800 and other proximate systems or devices, which need not necessarily be similar devices. For example, the short-range communications subsystem 816 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art.

What is claimed is:

1. A universal serial bus (USB) device, comprising:
a USB port on the USB device for coupling to a charging system, the USB port including a bus voltage (Vbus) connection, a positive data (D+) connection, and a negative data (D−) connection;
wherein a bus voltage (Vbus) is used to charge the USB device, and
wherein the USB device is configured to output a first voltage on the D+ connection and a second voltage on the D− connection wherein both D+ and D− are in a logic high range, and further configured to vary the first and second voltages when the USB device detects attachment to the charging system.

2. The USB device of claim 1, wherein the USB device is a mobile device, and wherein the bus voltage (Vbus) is used to charge a rechargeable battery in the mobile device.

3. The USB device of claim 1, wherein the USB device receives a device presence signal that indicates whether the USB device is coupled to the charging system, and wherein the device presence signal is used to generate an output on a user interface device.

4. The USB device of claim 3, wherein the user interface device is a light-emitting diode (LED), and wherein the LED is illuminated when the USB device is coupled to the charging system.

5. The USB device of claim 1, wherein the first voltage and the second voltage are varied within the logic high range.

6. The USB device of claim 1, further configured to:
maintain the first voltage at a higher voltage within the logic high range than the second voltage when the USB device is not coupled to charging system; and
when the USB device detects connection to the charging system, the USB device causes a variance in one of the first voltage or the second voltage such that the second voltage is higher than the first voltage within the logic high range.

7. A method for detecting that a USB device is attached to a USB charger, comprising:
generating a first USB data signal having a first voltage;
generating a second USB data signal having a second voltage;
wherein the first voltage and second voltage are both within a voltage range for a high logic state;
comparing the first data signal with the second data signal to detect if the first voltage varies with respect to the second voltage;
wherein the USB device causes the first voltage to vary with respect to the second voltage when the USB device detects it is attached to the USB charger.

8. The method of claim 7, further comprising:
if the first voltage varies with respect to the second voltage, then generating an output on a user interface device indicating that the USB device is attached to the USB charger.

9. The method of claim 7, wherein the first data signal is generated with a higher voltage than the second data signal, the USB device causes the first voltage to vary with respect to the second voltage when the USB device is attached to the USB charger such that the first voltage falls below the second voltage, and wherein the output on the user interface device is generated if the first voltage falls below the second voltage.

10. A universal serial bus (USB) device, comprising:
means for coupling a USB port on the USB device to a charging system, using a bus voltage (Vbus) connection, a positive data (D+) connection, and a negative data (D−) connection;
means for receiving the bus voltage (Vbus), wherein the bus voltage (Vbus) is used to charge the USB device; and
means for outputting both D+ and D− in a logic high state, and varying the first and second voltages to enable use of the Vbus to charge the USB device.

* * * * *